United States Patent [19]

Anno et al.

[11] Patent Number: 5,371,680
[45] Date of Patent: Dec. 6, 1994

[54] ACCOUNTING BOOK AUTOMATIC ENTERING DEVICE

[75] Inventors: Takamitsu Anno; Manabu Mizutani, both of Tokyo; Gousuke Anno, Kanagawa; Shoji Takada, Tokyo, all of Japan

[73] Assignee: Koken Kaihatsu Co., Ltd., Tokyo, Japan

[21] Appl. No.: 145,467

[22] Filed: Oct. 29, 1993

[51] Int. Cl.⁵ ............ G06F 15/20; G06F 15/30
[52] U.S. Cl. .................... 364/478; 364/406; 235/432; 400/23; 400/70; 400/78
[58] Field of Search ............... 364/401–403, 364/406–408, 478; 235/375, 379, 380, 432; 400/23, 24, 27, 28, 61, 67, 70, 73, 77, 78

[56] References Cited

U.S. PATENT DOCUMENTS

| | | | |
|---|---|---|---|
| 5,017,026 | 5/1991 | Takesako et al. | 400/24 |
| 5,113,349 | 5/1992 | Nakamura et al. | 364/478 |
| 5,142,129 | 8/1992 | Nakamura et al. | 235/379 |
| 5,192,140 | 3/1993 | Nukada | 400/28 |

Primary Examiner—Roy N. Envall, Jr.
Assistant Examiner—Steven R. Garland
Attorney, Agent, or Firm—Flynn, Thiel, Boutell & Tanis

[57] ABSTRACT

An accounting book automatic entering device, by which, when it is used for business processing in an accounting system, linked with an output device of a computer, trade data can be recorded in lines directly succeeding the last line of the preceding recording also on the rear side of book sheets of all the relating books and they can be conserved in the form of books after recording only by inputting one assortment so that they can be accessed at any time. A book holding shelf driving device locates a shelf of a book holding shelf corresponding to a shelf code, based on the shelf code in positional data stored in a memory device and an entry page selecting device driving section drives an entry page selecting device so as to select a specified book to fix it by means of a book selecting mechanism, to open the book at a target page by means of a page turning mechanism and for a printer to record output data on that page. At this time, entry position on an entry book sheet is recognized, depending on the number of lines, in which the output data have been already entered, and the printer records the output data in lines directly succeeding the last line of the preceding recording. When recording is terminated, the entry page selecting device closes the book and returns it to its original position in the book holding shelf.

5 Claims, 18 Drawing Sheets

FIG. 9A th YEAR OF HEISEI    111-08 CURRENT ACCOUNT

| MONTH | DAY | OTHER PARTY, ITEM | REMARKS | INCREASE | DECREASE | REMAINDER |
|---|---|---|---|---|---|---|
| 4 | 1 | TRANSFER | | | | 806956 |
| 4 | 15 | 112-08 ORDINARY DEPOSIT, ○○ | CHANGEOVER | 1000000 | | 1806956 |
| 4 | 20 | 227-01 ○○○○ | PAYMENT TO ○○○○ FOR ○ th MONTH | | 20000 | 1786956 |
| 4 | 20 | 131-09 PROVISIONAL PAYMENT OF CONSUMPTION TAX | PROVISIONAL PAYMENT OF CONSUMPTION TAX | | 5400 | 1781556 |
| 4 | 20 | 131-09 PROVISIONAL PAYMENT OF CONSUMPTION TAX | PROVISIONAL PAYMENT OF CONSUMPTION TAX | | 66605 | 1714951 |
| 4 | 20 | 227-01 ○○○○ | PAYMENT TO ○○○○ FOR ○ th MONTH | | 535040 | 1179911 |
| 4 | 20 | 131-09 PROVISIONAL PAYMENT OF CONSUMPTION TAX | PROVISIONAL PAYMENT OF CONSUMPTION TAX | | 23724 | 1156187 |
| 4 | 20 | 217-03 ○○○○ | PAYMENT TO ○○○○ FOR ○ th MONTH | | 154720 | 1001467 |
| 4 | 20 | 503-92 WELL-BEING, WELFARE | INJURY INSURANCE BILL | | 82126 | 919341 |
| 4 | 20 | 218-04 SHISEIDO | PAYMENT TO ○○○○ FOR ○ th MONTH | | 118572 | 800769 |
| 4 | 20 | 131-09 PROVISIONAL PAYMENT OF CONSUMPTION TAX | PROVISIONAL PAYMENT OF CONSUMPTION TAX | | 64 | 800705 |
| 4 | 20 | 131-09 PROVISIONAL PAYMENT OF CONSUMPTION TAX | PROVISIONAL PAYMENT OF CONSUMPTION TAX | | 5571 | 795134 |
| 4 | 20 | 131-09 PROVISIONAL PAYMENT OF CONSUMPTION TAX | PROVISIONAL PAYMENT OF CONSUMPTION TAX | | 487 | 794647 |
| | | MONTHLY SUM | | 1000000 | 1012309 | |

FIG.9B

| MONTH DAY | | OTHER PARTY, ITEM | REMARKS | INCREASE | DECREASE | REMAINDER |
|---|---|---|---|---|---|---|
| 4 | 21 | 509-97 RENT, EXPENSES FOR LIGHT AND FUEL | ○○ BUILDING RENT FOR (MONTH) | | 150800 | 643847 |
| 4 | 21 | 509-97 RENT, EXPENSES FOR LIGHT AND FUEL | ○○ BUILDING MANAGEMENT EXPENSES FOR ○th MONTH | | 11000 | 632847 |
| 4 | 21 | 509-97 RENT, EXPENSES FOR LIGHT AND FUEL | ○○ BUILDING WATER CHARGES FOR ○ th MONTH | | 8000 | 624847 |
| 4 | 21 | 509-97 | | | 1500 | 623347 |
| 4 | 21 | 131-09 PROVISIONAL PAYMENT OF CONSUMPTION TAX | ○○ BUILDING PROVISIONAL PAYMENT OF CONSUMPTION TAX | | 5094 | 618253 |
| 4 | 21 | 509-96 MISCELLANEOUS EXPENSES, HIRE | FACSIMILE COMMISSION | | 2214 | 616039 |
| 4 | 27 | 161-06 RESERVE FOR INSURANCE BILL | ○○○○ INSURANCE BILL | | 90600 | 525439 |
| 5 | 14 | 112-08 ORDINARY DEPOSIT ○○ | CHANGEOVER | 1000000 | | 1525439 |
| 5 | 20 | 131-09 PROVISIONAL PAYMENT OF CONSUMPTION TAX | | | 9210 | 1516229 |
| 5 | 20 | 227-101 ○○○○ | PAYMENT TO ○○○○ FOR ○ th MONTH | | 521040 | 995189 |
| 5 | 20 | 131-09 PROVISIONAL PAYMENT OF CONSUMPTION TAX | PROVISIONAL PAYMENT OF CONSUMPTION TAX | | 7800 | 987389 |
| 5 | 20 | 217-03 ○○○○ | ○○○○ PAYMENT | | 154720 | 832669 |
| 5 | 20 | 503-92 WELL-BEING, WELFARE | INJURY INSURANCE BILL | | 82126 | 750543 |
| 5 | 20 | 131-09 PROVISIONAL PAYMENT OF CONSUMPTION TAX | PROVISIONAL PAYMENT OF CONSUMPTION TAX | | 441 | 750102 |
| 5 | 20 | 218-04 ○○○○ | PAYMENT TO ○○○○ FOR ○th MONTH | | 21600 | 728502 |
| 5 | 20 | 131-09 PROVISIONAL PAYMENT OF CONSUMPTION TAX | PROVISIONAL PAYMENT OF CONSUMPTION TAX | | 648 | 727854 |
| | | MONTHLY SUM | | 1000000 | 1066793 | |

FIG.9C

| MONTH | DAY | OTHER PARTY, ITEM | | REMARKS | INCREASE | DECREASE | REMAINDER |
|---|---|---|---|---|---|---|---|
| 5 | 21 | 509-97 | RENT, EXPENSES FOR LIGHT AND FUEL | ○○○○ BUILDING RENT FOR ○th MONTH | | 150800 | 577054 |
| 5 | 21 | 509-97 | RENT, EXPENSES FOR LIGHT AND FUEL | ○○○○ BUILDING MANAGEMENT EXPENSES FOR ○th MONTH | | 11000 | 566054 |
| 5 | 21 | 509-97 | RENT. EXPENSES FOR LIGHT AND FUEL | ○○○○ BUILDING WATER CHARGES FOR ○th MONTH | | 1500 | 564554 |
| 5 | 21 | 131-09 | PROVISIONAL PAYMENT OF CONSUMPTION TAX | ○○○○ BUILDING PROVISIONAL PAYMENT OF CONSUMPTION TAX | | 4854 | 559700 |
| 5 | 21 | 509-96 | MISCELLANEOUS EXPENSES, HIRE | ○○○○ FACSIMILE COMMISSION | | 2173 | 557527 |
| 5 | 25 | 161-06 | RESERVE FOR INSURANCE BILL | ○○○○ INSURANCE BILL | | 290600 | 266927 |
| 5 | 26 | 503-00 | WEAR AND TEAR EXPENSES | ○○○○ FIRE INSURANCE BILL FOR FACTORY | | 90600 | 176327 |
| 5 | 27 | 112-03 | ORDINARY DEPOSIT | CHANGEOVER | 1500000 | | 1676327 |
| 5 | 29 | 242-01 | APPROPRIATION AS JUDICIAL PERSON | PAYMENT OF PREFECTURAL RESIDENT TAX FOR ○○○○ OFFICE | | 122500 | 1553827 |
| 5 | 29 | 509-98 | TAXES, PUBLIC IMPOSTS | PAYMENT OF ENTERPRISE TAX FOR ○○○○ OFFICE | | 670200 | 883627 |
| 5 | 29 | 242-01 | APPROPRIATION AS JUDICIAL PERSON | PAYMENT OF MUNICIPAL TAX FOR ○○○○ ESTABLISHMENT | | 334900 | 548727 |
| 6 | 20 | 131-09 | PROVISIONAL PAYMENT OF CONSUMPTION TAX | PROVISIONAL PAYMENT OF CONSUMPTION TAX | | 85242 | 463485 |
| 6 | 20 | 131-09 | PROVISIONAL PAYMENT OF CONSUMPTION TAX | PROVISIONAL PAYMENT OF CONSUMPTION TAX | | 2644 | 460841 |
| 6 | 20 | 217-03 | ○○○○ | PAYMENT TO ○○○○ FOR ○th MONTH | | 154720 | 306121 |
| 6 | 20 | 503-92 | WELL-BEING, WELFARE | INJURY INSURANCE BILL | | 82126 | 223995 |
| 6 | 20 | 218-03 | ○○○○ | PAYMENT TO ○○○○ FOR ○th MONTH | | 420 | 223575 |
| 6 | 20 | 131-09 | PROVISIONAL PAYMENT OF CONSUMPTION TAX | PROVISIONAL PAYMENT OF CONSUMPTION TAX | | 12 | 223563 |
| | | TO NEXT PAGE | | | | | |

FIG. 12A
PRIOR ART

| COUNTING ITEM MASTER FILE |
| --- |
| CODE CLASSIFICATION |
| ITEM CODE |
| NAME OF ITEM |
| HIRE FLAG |
| OUTPUT FLAG |
| CUSTOM MASTER FLAG |
| SUPPLIER MASTER FLAG |
| STORED GOODS MASTER FLAG |
| |

FIG. 12B
PRIOR ART

| ITEM BALANCE FILE |
| --- |
| ITEM CODE |
| YEAR AND MONTH OF TERM END |
| NUMBER OF LAST INPUT FILE |
| ALREADY PRINTED FLAG |
| NUMBER OF ASSORTMENTS (JANUARY~DECEMBER) |
| TRANSFER FROM PRECEDING TERM |
| TRANSFER AT BEGINNING OF MONTH |
| SUM OF DEBTOR AMOUNTS (JANUARY~DECEMBER) |
| |

FIG.12C
PRIOR ART

| STORED GOODS MASTER FILE |
|---|
| STORED GOODS CODE |
| YEAR AND MONTH OF TERM END |
| LIST OF STORED GOODS |
| NAME OF STORED GOODS |
| AMOUNT UNIT |
| SORT CODE |
| AMOUNT BROUGHT FORWARD AT TERM BEGINNING |
| AMOUNT AT BEGINNING OF MONTH |
| STANDARD COST PRICE |
| UNIT PRICE BROUGHT FORWARD AT TERM BEGINNING |
| UNIT PRICE AT END OF MONTH (JANUARY~DECEMBER) |
| AMOUNT OF MONEY FOR BUYING-IN FOR RELEVANT MONTH (JANUARY~DECEMBER) |
| SUM OF WAREHOUSING (JANUARY~DECEMBER) |
| SUM OF DELIVERY OF GOODS (JANUARY~DECEMBER) |
| |

FIG.12D
PRIOR ART

| CUSTOMER MASTER FILE |
| --- |
| CUSTOMER CODE |
| CODE OF OUR COMPANY BY OTHER PARTY |
| NAME OF CUSTOMER |
| NAME OF PERSON IN CHARGE |
| NAME OF BANK |
| CLOSING DATE |
| DATE OF DEMAND FOR PAYMENT |
| CONDITION FOR PAYMENT |
| CONDITION FOR LIQUIDATION |
| POSTAL CODE |
| ADDRESS 1 |
| ADDRESS 2 |
| TELEPHONE NUMBER |
| TELEPHONE NUMBER (FAX) |
| |

FIG. 12E
PRIOR ART

| SUPPLIER MASTER FILE |
|---|
| SUPPLIER CODE |
| NAME OF SUPPLIER |
| NAME OF PERSON IN CHARGE |
| NAME OF BANK |
| BANK CODE |
| CLOSING DATE |
| DATE OF DEMAND FOR PAYMENT |
| CONDITION FOR PAYMENT |
| CONDITION FOR LIQUIDATION |
| POSTAL CODE |
| ADDRESS 1 |
| ADDRESS 2 |
| TELEPHONE NUMBER |
| TELEPHONE NUMBER (FAX) |

FIG. 12F
PRIOR ART

| REMARKED OTHER PARTY ITEM MASTER FILE |
|---|
| HIRE FLAG |
| ITEM CODE (6) |
| REMARK SENTENCE |

FIG. 13B
PRIOR ART
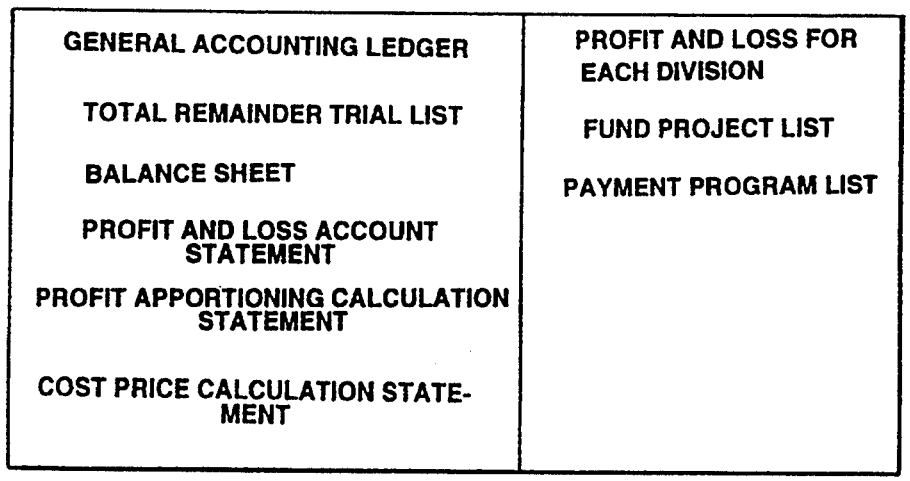
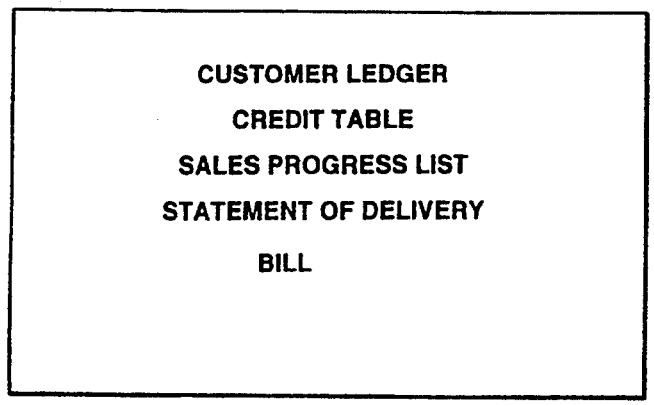
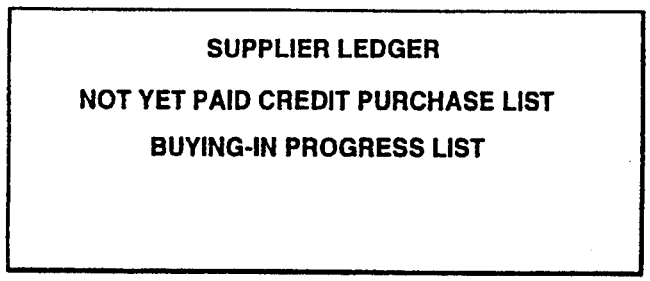
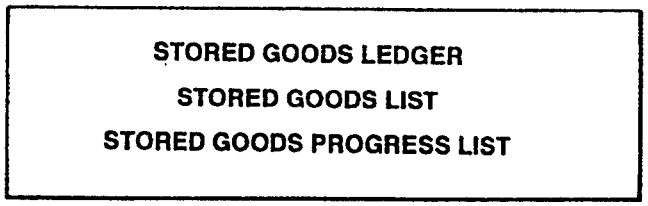

ACCOUNTING BOOK AUTOMATIC ENTERING DEVICE

FIELD OF THE INVENTION

The present invention relates to an accounting book automatic entering device used in linkage with an accounting computer system.

BACKGROUND OF THE INVENTION

Taking a usual trade in an enterprise as an example, when a trade (sale on credit) of certain goods is effected, a certain number of the goods decreases and credit is increased in compensation therefor. In order to record such variations one by one, at first the trade is recorded in a journal, stored amount of the goods is decreased in a stock book, and further credit for the sale is entered in a sales book. In addition, at collection of bills corresponding thereto it is necessary to distinguish whether it is effected in cash or by a note and if it is effected by a note, to record what date the liquidation day is. However a great load in office work is required for entering/transcribing all minute variations on all such occasions.

For this reason, in practice, when a trade was effected, e.g. in accounting office work, book entering was restricted to be necessary minimum and later it was entered in relevant books. This and others produced time delay. Further accordance between goods and books was verified by an inventory, by taking such procedure that the trade was temporarily interrupted, etc. For this reason, there were inconveniences that it was difficult to seize always precise stored goods, etc.

Heretofore, for recording and summing trades of an enterprise there are known various methods for business calculating systems such as e.g. an enterprise accounting system, a sales management system, a stock management system, a note management system, etc. and computing devices such as large or middle scale computers, mini-computers, so-called office computers, personal computers, etc. are used, depending on the scale of the enterprise or establishment. Further, as the form of utilization, there are known on-line concentrated management, dispersed management by means of independent computing devices, dispersed type concentrated management, which is a compromise between the both types, etc.

These recording and summation of trade data of an enterprise using computers as described above are carried out by using means constituting the various business calculating systems as described above, each of which is fundamentally composed of an input device 1 (keyboard 1-1, floppy disk 1-2, hard disk 1-3, etc.), a central processing unit (CPU) 2, an internal memory device 2', an external memory device (magnetic disk, etc.) 3, an output device (printer) 4, etc., as shown by a block diagram indicated in FIG. 10.

In a computer processing system as described above, trade data of an enterprise produced usually are inputted through the input device such as a keyboard 1-1 on the basis of specification slips and stored in the memory devices through the CPU 2. At this time, in general, data of each trade (usually data of one line on a slip) are stored as assortment data and at the same time they are subjected to calculating processing to be stored in a predetermined section on a predetermined master file. Trade data of an enterprise stored in this way are summed and analyzed for every period such as day, month, term, year, etc. and outputted usually on a continuous sheet (hereinbelow called printer sheet) serving as print medium as a report such as a trade daily report, monthly report, termly report, yearly report, etc., respectively.

FIG. 11 shows an example of a file formed on a memory medium (magnetic disk, etc.) of the external memory device 3 in an accounting system. Each of such files has a number of memory regions calculated on the basis of the greatest record number anticipated therefor. FIGS. 12A-12F show examples of format for different records constituting each file as described above. FIG. 13A is a process chart showing flow of processing by the accounting system indicated in FIG. 11 and FIG. 13B shows various kinds of book sheets as final outputs.

In FIG. 13A, trade data written on a primary slip (sales memorandum, etc.) 131 are inputted through the keyboard 1-1, etc. by input processing 132, subjected to code checking using each of the master files 133 in the external memory device 3, etc., and stored in detailed assortment files 134 in the external memory device 3.

Next, at the same time as the input processing or after having completed input of usually daily trade data, record items in each of the master files 136 corresponding to each of data sets in the detailed assortment file 134 in the memory device 3 are calculated by a updating - calculating processing 135 to be updated. For example, sales data are added to a sales amount item in the customer master file, which is thus updated.

Further the detailed assortment file 134 is outputted by printing in the order of trades for every accounting item as a journal 137 and daily trade data are outputted by printing to a daily sum list as a balance list. Furthermore various sorts of book sheets and tables indicated in the figure are printed out by financial information forming processing 139 to stored goods information forming processing 142 for every predetermined period of time such as day, month, term, year, etc. in the form of a daily report, a monthly report, a termly report, a yearly report, etc., respectively.

In the prior art example trade data are stored in a detailed assortment file and every day in a enterprise (establishment) having a large trade amount and at least every month even in an enterprise (establishment) having a small trade amount due to restriction by the magnitude of the detailed assortment file, detailed assortments are outputted, classified into predetermined divisions.

The detailed assortment file may be stored to be conserved in a large capacity memory medium of the external memory device (magnetic disk, etc.). In any case, it is usually outputted finally by printing on a printer sheet.

For the sake of convenience for reference, the detailed assortment is outputted on different pages of the printer sheet for every division and collected for every different division after the termination of the output to be filed. At this time, in many cases the detailed assortment for every division is printed till an intermediate line on the last page and the remaining lines remain as blank space and therefore there is a drawback that the detailed assortment for the succeeding day (or detailed assortment for the succeeding month) cannot be recorded directly after the last line on the last page for the preceding day (or preceding month). Further, there is a drawback that, in the case where printer sheets are filed, detailed assortment data cannot be recorded on the rear sides of the sheets as succeeding pages, while they can be done for a book in binding (general accounting ledger, journal, etc.). For this reason, there was a drawback that for this reason not only the effective utilization ratio as a book sheet of printer sheet cannot exceed 50% but also an amount of sheet wastefully used is 10 times as great as that produced for a book manually written, because data are printed every time it is necessary.

OBJECT OF THE INVENTION

The present invention has been done in view of the drawbacks and inconveniences described above and the object thereof is to provide an accounting book automatic entering device, which is used, linked with an output device (printer) of a computer and in which only by inputting certain trade data, e.g. only by inputting assortment of credit in the case where a certain article is sold in credit, the relevant trade data are recorded in a journal and transcribed into a general accounting ledger; decrease in the relevant article is recorded in a stored goods ledger; credit of the relevant customer is increased; further an invoice, a statement of delivery, and a bill are also issued on real time; in this way only by inputting one assortment it is written in lines directly succeeding the last line of the preceding recording in all the relating books in an accounting system to be added thereto; further when all the recording lines on a front page are filled, data can be printed continuously on a rear page; it is possible also to turn the page after the termination of printing both on the front page and on the rear page; thus not only sheet is saved but also the trade data are kept in the books after the termination of recording without any special device nor time nor additional work, which can be accessed at any time.

BACKGROUND OF THE INVENTION

In order to achieve the above object, an accounting book automatic entering device according to the present invention is characterized in that it comprises a computer device; a memory device containing a plurality of output data sets, to which a branch code, a division code, a business connection code, etc. can be added arbitrarily, and which have identifiers making it possible to identify a page and a line, in which the data sets are to be printed; a printer, a book holding shelf provided with a plurality of shelves holding books; a book holding shelf driving device; and an entry page selecting device provided with a book selecting mechanism for taking out by selecting a specified book from the book holding shelf to fix it and a page turning mechanism for selecting a specified page in the book; wherein a shelf in the book holding shelf corresponding to output data is located at a predetermined position of the entry page selecting device by the book holding shelf driving device; the specified book is taken out by selecting it by means of the book selecting mechanism to be fixed; the book is opened at a target page by the page turning mechanism; and the book is closed and returned to an original position thereof in the book holding shelf after the output data have been printed at the position, in which they should be printed, on the relevant page by the printer.

The accounting book automatic entering device described above according to the present invention is characterized in that it comprises further a sheet receiving and issuing device provided with a binder mounting and dismounting mechanism for mounting and dismounting a book sheet on and from a binder; a sheet inverting mechanism for inverting the book sheet in front and rear side; a sheet receiving and issuing mechanism for receiving and issuing the book sheet in/from a predetermined position; wherein the book sheet is detached from the binder by the binder mounting and dismounting mechanism; the book sheet is inverted in front and rear side, if it is necessary to print the trade data on the rear side; the book sheet is supplied to the printer by the sheet receiving and issuing mechanism; line forwarding means of the printer forwards the book sheet line by line till an entry position; after the output data have been recorded, the book sheet is bound at the original position thereof in the book; the book is closed and returned to the original position thereof in the book holding shelf.

The accounting book automatic entering device described above comprises further preferably an identifier reading device for reading an identifier, an entry book sheet having an identifier; and book sheet judging means for judging whether the book sheet taken out by the entry page selecting device is correct or not by comparing the identifier on the book sheet with the identifier in the output data at the output thereof. Further, in this case, it is possible also to print an identifier on a not yet entered book sheet by means of the printer, when it is supplied thereto.

Owing to the construction described above, in the accounting book automatic entering device according to the present invention, the book holding shelf driving device locates a shelf of the book holding shelf corresponding to output data at a predetermined position on the basis of the identifier of the output data when the output data is outputted; the book selecting mechanism takes out a specified book by selecting it to fix it; the page turning mechanism opens the book at a target page; and the printer prints the output data thereon. At this time, the printer prints the output data, starting from a line directly succeeding the last line printed last time, while setting a printing head at a position on an entry book sheet, where the output data should be printed, on the basis of the identifier of the output data. When printing on the book sheet by means of the printer is completed, the book is closed and returned to the original position thereof in the book holding shelf.

Further, in the accounting book automatic entering device, the book sheet is detached from a binder by the binder mounting and dismounting mechanism in the sheet receiving and issuing device. Then it is distinguished on the basis of the identifier of the output data whether the book sheet should be inverted or not. The sheet inverting mechanism inverts the book sheet, depending on a result thus obtained; the sheet receiving and issuing mechanism supplies the book sheet to the printer; and the line forwarding means of the printer forwards the book sheet line by line till the entry position. After the output data have been recorded, the book is closed and returned to the original position thereof in the book holding shelf.

BRIEF DESCRIPTION OF THE DRAWINGS

FIGS. 9A to 9C show an example of the outputted book sheet in the case where the present invention is applied thereto;

FIGS. 12A to 12F show examples of recording formats constituting different files indicated in FIG. 11;

FIG. 13B shows various sorts of book sheets for the accounting system indicated in FIG. 11.

DETAILED EXPLANATION

Figure 1:
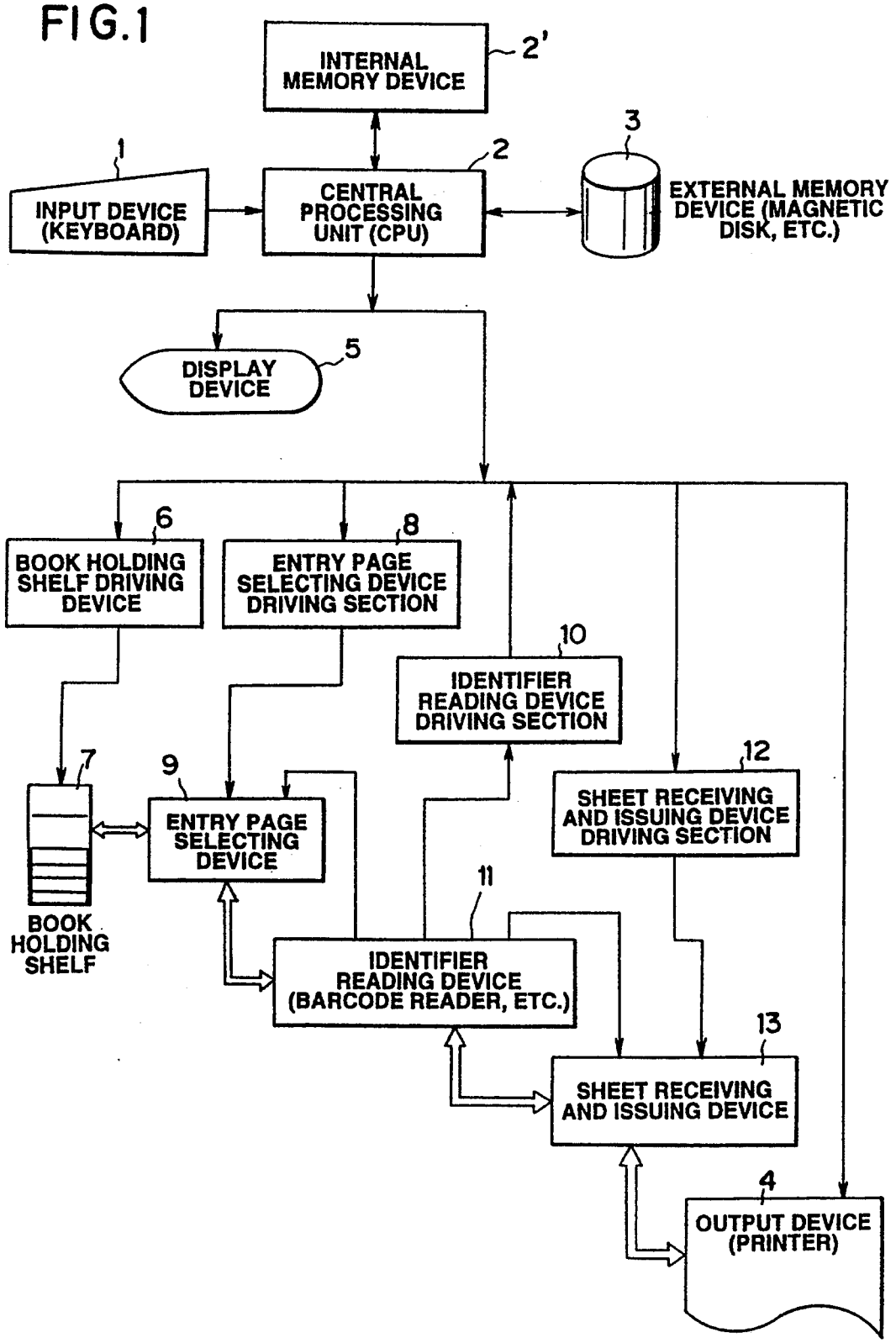
FIG. 1 is a block diagram showing the construction of an embodiment of the accounting book automatic entering device according to the present invention.

Hereinbelow an embodiment of the present invention will be explained, referring to the drawings.

Figure 10:
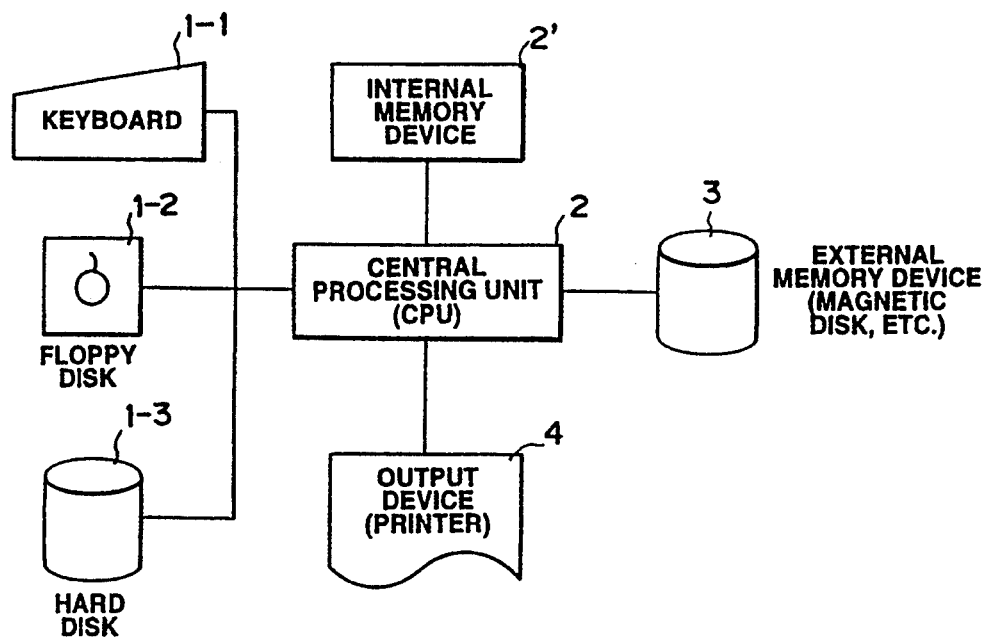
FIG. 10 is a block diagram showing an example of the construction of hard ware of a prior art accounting system.

FIG. 1 is a block diagram showing the construction of the embodiment of the accounting book automatic entering device according to the present invention. In FIG. 1, reference numerals identical to those used in FIG. 10 indicate constructional parts identical or similar thereto, i.e. 1 is an input device (keyboard); 2 is a central processing unit (CPU); 2' is an internal memory device; 3 is an external memory device (magnetic disk, etc.); 4 is an output device (printer); 5 is a display device; 6 is a book holding shelf driving device; 7 is a book holding shelf including a plurality of shelves; 8 is an entry page selecting device driving section; 9 is an entry page selecting device; 10 is an identifier reading device driving device; 11 is an identifier reading device (bar code reader, etc.); 12 is a sheet receiving and issuing device driving section; and 13 is a sheet receiving and issuing device. In addition, double lines in the figure show paths, along which book sheets are moved.

Not yet entered book sheets are bound previously in books or stored in a paper cassette of the printer. In this case, they may be blank, but sheets, in which rule marks, etc. are printed previously, may be prepared for a journal, a general accounting ledger, a cash book, etc. For blank sheets necessary marks such as rule marks are printed by the printer 4 at printing of headlines described later. Further the size of the book sheets should be dimensions restricted by the printer 4. In the case where it is applied to an accounting system, the size of journals, general accounting ledgers and cash books generally sold in the market is preferable. Further it is preferable that binding holes for filing are formed in the book sheet. Furthermore, in the present embodiment, a bar code is printed previously on an upper or lower part of each book sheet as an identifier or a bar code is printed together with necessary marks such as rule marks or item code at printing headlines described later.

Figure 2:
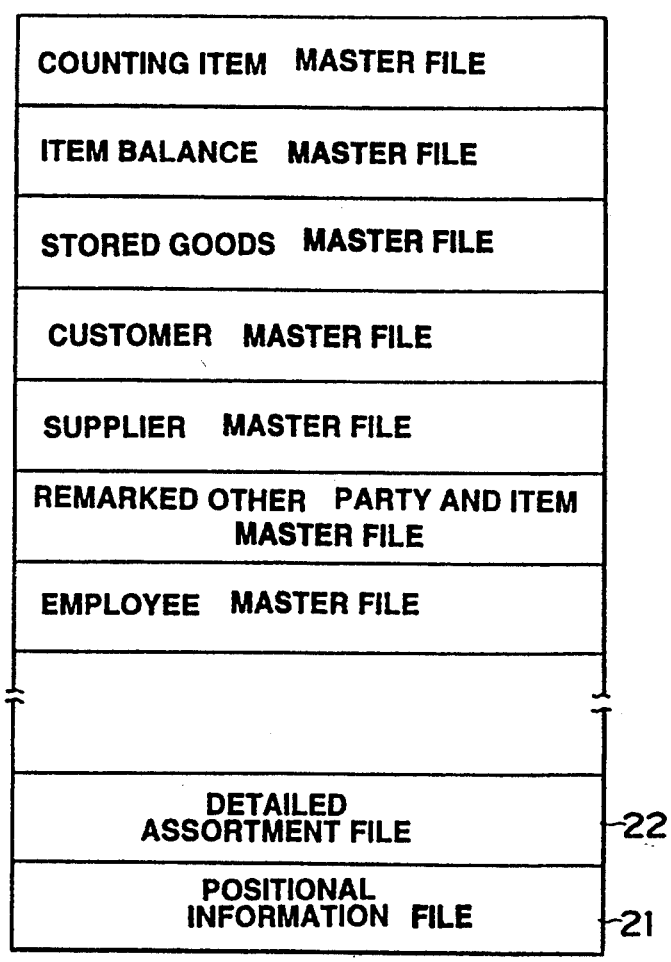
FIG. 2 shows an example of the file structure for the memory device in the accounting system according to the present invention.
Figure 11:
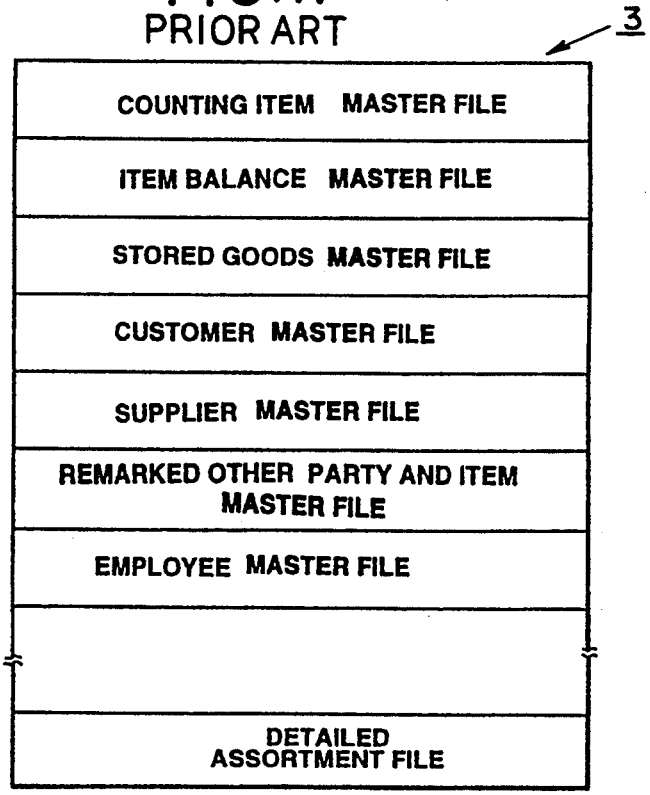
FIG. 11 shows an example of the file structure for the memory device in the prior art accounting system.
Figure 13A:
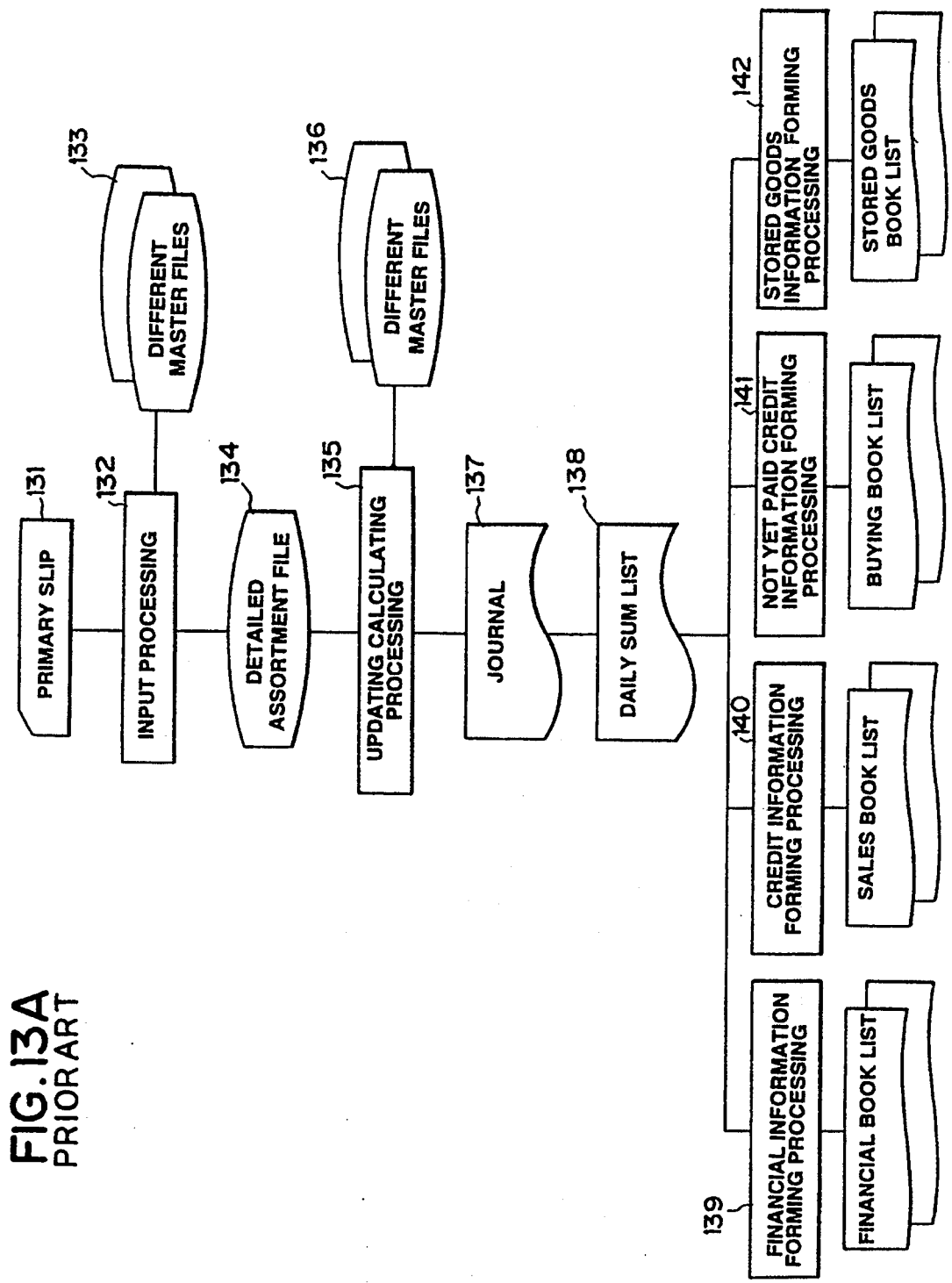
FIG. 13A is a process chart for the accounting system indicated in FIG. 11.

FIG. 2 shows an example of the file structure for the external memory device 3, in the case where the present invention is applied to an accounting system. When it is compared with the file structure indicated in FIG. 11 for the prior art accounting system, the file structure indicated in FIG. 2 differs from the latter in that the former has a positional information file 21 consisting of a plurality of positional data sets including shelf positioning information for positioning the book holding shelf 7 at a predetermined position of the entry page selecting device 9 and entry position information indicating the position entered last time in the book, in which relevant data should be entered.

Figure 3:
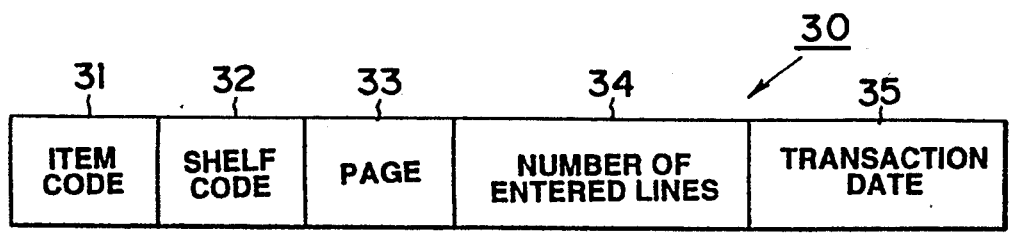
FIG. 3 shows an example of data structure of positional data contained in the positional information file indicated in FIG. 2.

FIG. 3 shows an example of data structure of the positional data 30 included in the positional information file 21 and the positional data 30 include an item code 31 as an identifier, a shelf code 32 as shelf positioning information, a page 33 as entry position information, a number of entered lines 34 and a transaction data 35.

Figure 4:
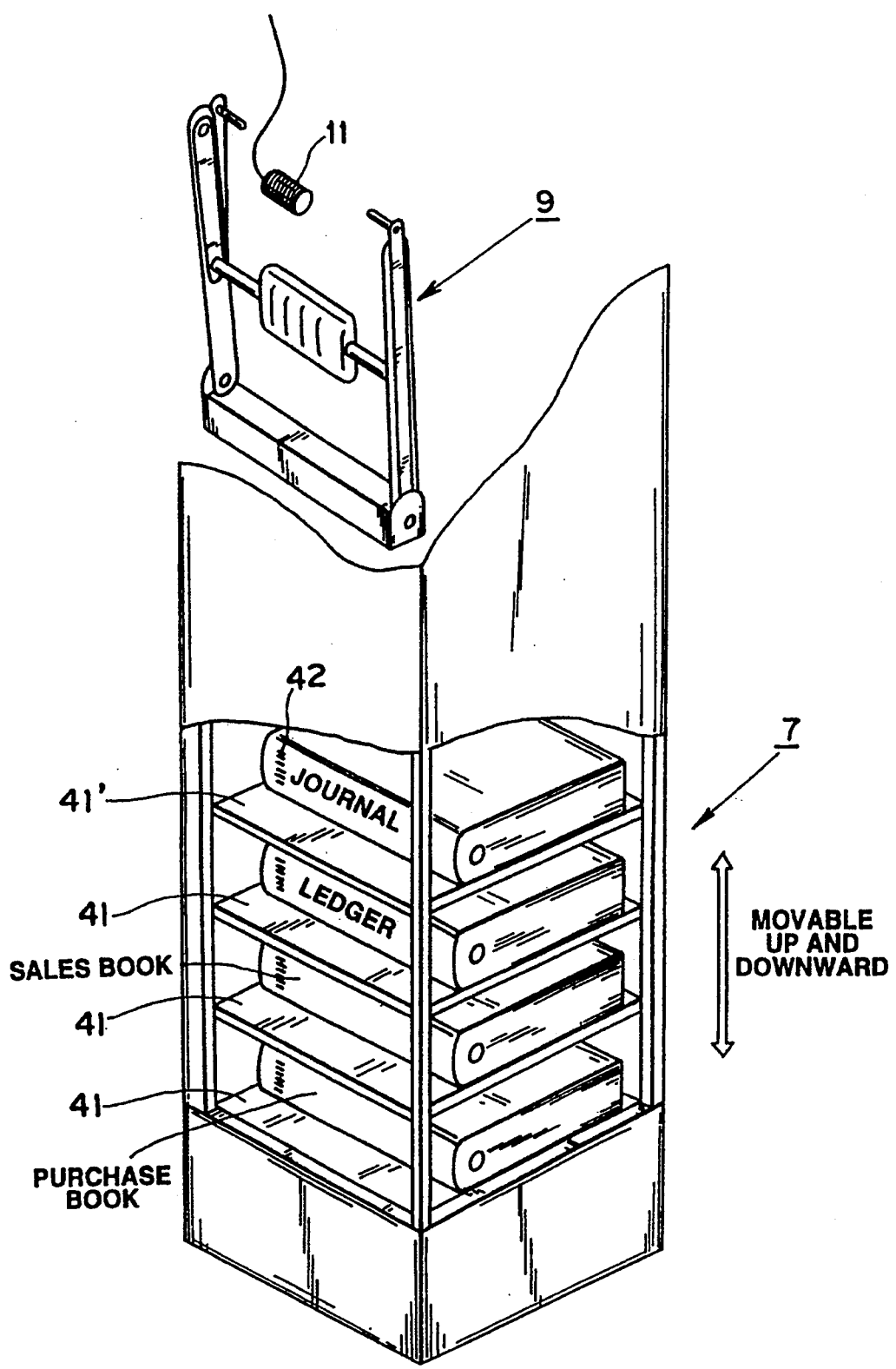
FIG. 4 is a perspective view showing an example of the book holding shelf and the entry page selecting device.

FIG. 4 shows an example of the book holding shelf 7 and the entry page selecting device 9. The book holding shelf 7 includes a plurality of shelves 41 accommodating accounting books, which are driven by the book holding shelf driving device 6 so that a shelf, on which a specified book is put, is positioned at a predetermined position of the entry page selecting device 9. Further a shelf position identifier 42 for positioning the specified shelf 41 with respect to the entry page selecting device 9 by means of the shelf holding shelf driving device 6 is marked on each book.

The book holding shelf driving device 6 moves the book holding shelf 7 up and downward according to command from the CPU 2 so that the shelf 41', in which a book corresponding to the shelf code 32 of the positional data in FIG. 3 is put, is positioned at the predetermined position of the entry page selecting device 9 or the book holding shelf 7 is returned to the original position thereof.

The entry page selecting device 9 is driven by the entry page selecting device driving section 8 and the specified book put on the shelf 41' positioned at the predetermined position of the entry page selecting device 9 is selected and fixed. The book is opened at a target page or closed and returned to the original position thereof on the book holding shelf 7.

Figure 5A:
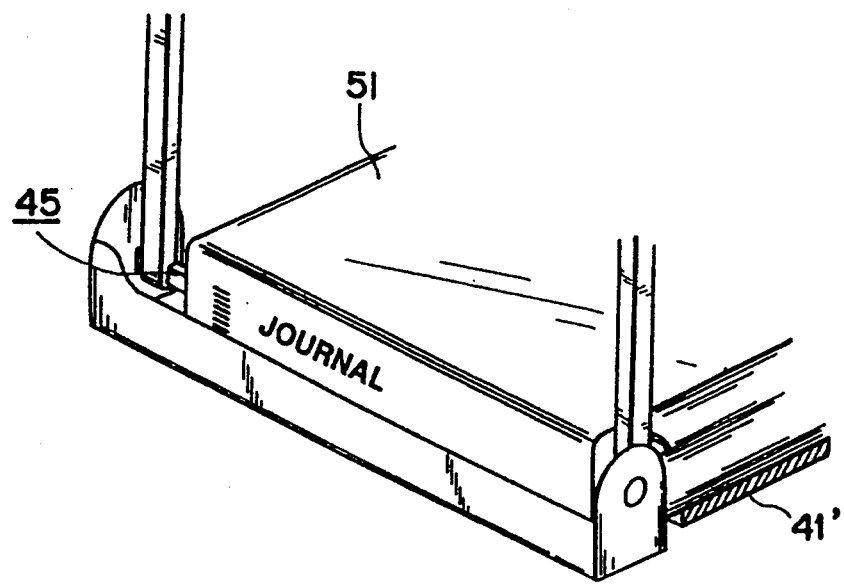
FIGS. 5A and 5B show an example of the book holding shelf and the entry page selecting device, respectively.
Figure 5B:
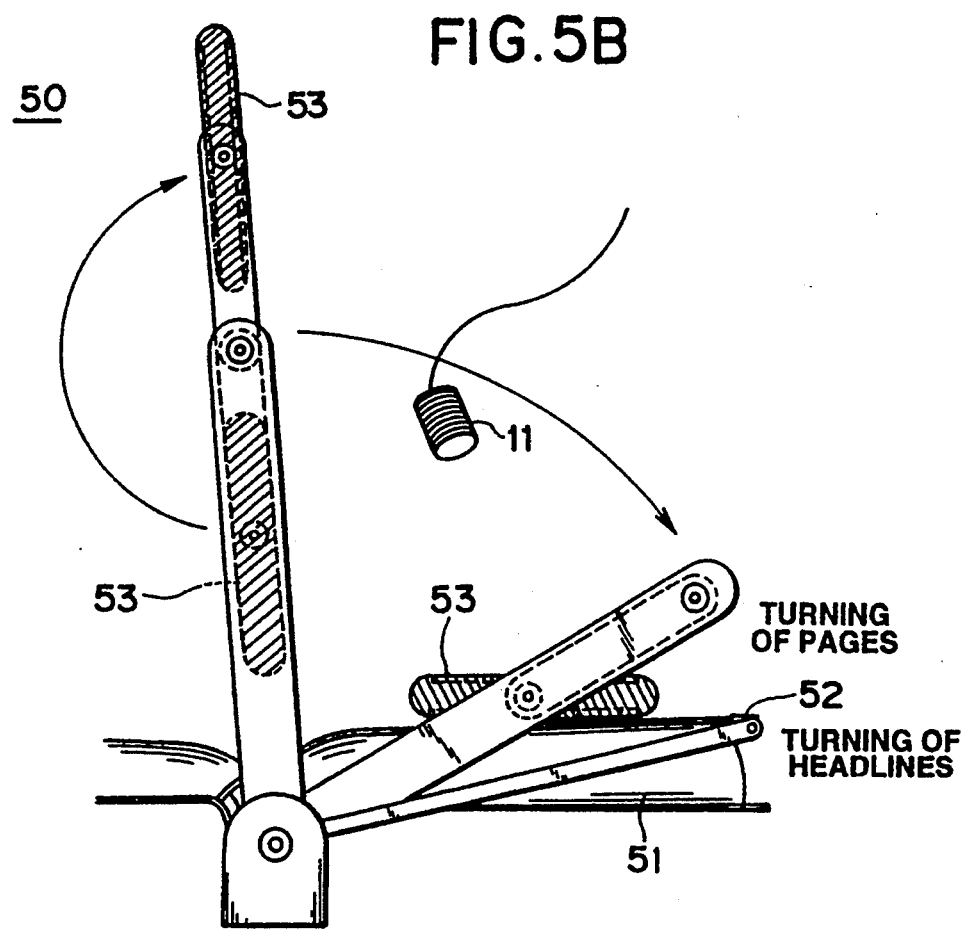

FIGS. 5A and 5B show a mechanism of the entry page selecting device 9, in which FIG. 5A shows an example of the book selecting mechanism 45 and FIG. 5B represents the page turning mechanism 50. The binder of the relevant book 51 located at the predetermined position is fixed at a hinge thereof to hold the book 51 by the book selecting mechanism 45. Next the book 51 is opened at the first page of an aimed classification by the page turning mechanism 50 making use of at first a headline 52 of a higher rank classification. Then the CPU 2 calculates how many pages should be turned and pages of the book are turned by the necessary number of pages thus obtained (about 50 at maximum) while setting a page turning and sheet sucking disk 53. The identifier reading device 11 reads out the identifier printed on the relevant book sheet to confirm the target book sheet or the target page. At this time, when the page 33 of the positional data 30 is even (which means that the relevant page is on the rear side) and the number of already entered lines 34 is equal to the number of lines for one page (51 lines in the embodiment), a not yet entered book sheet is selected. When the printer has terminated printing, the book 51 is closed and the book holding shelf 7 is returned to the original position thereof.

Figure 6A:
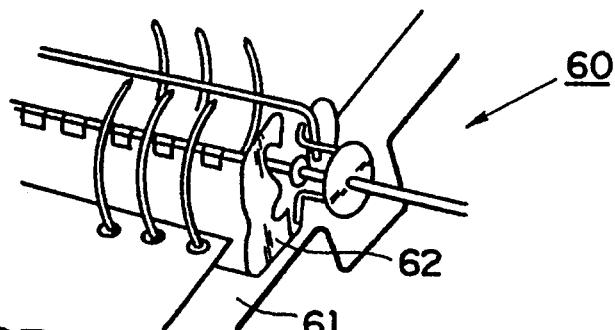
FIGS. 6A, 6B and 6C show an example of the binder mounting and dismounting mechanism, the sheet inverting mechanism and the sheet receiving and issuing mechanism, respectively, in the sheet receiving and issuing device.
Figure 6B:
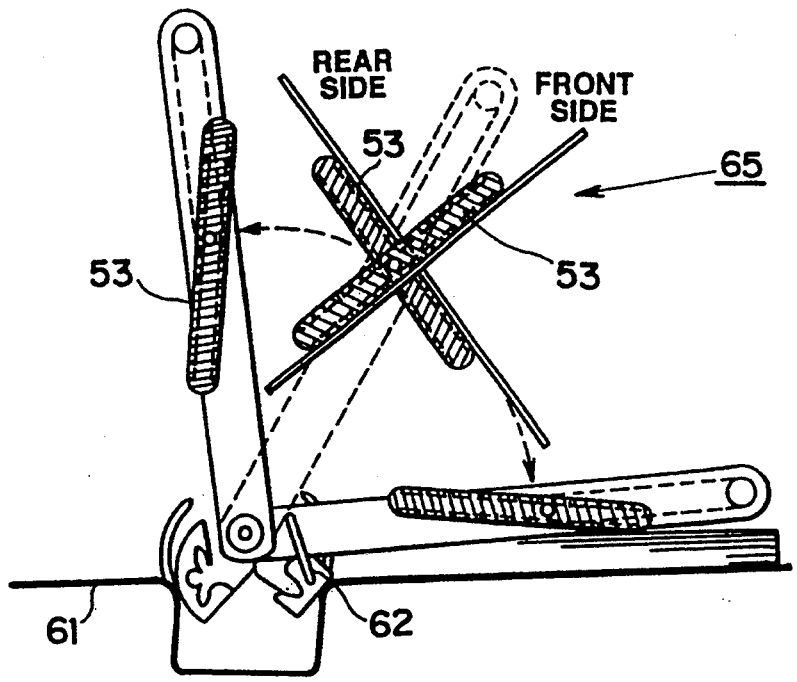
Figure 6C:
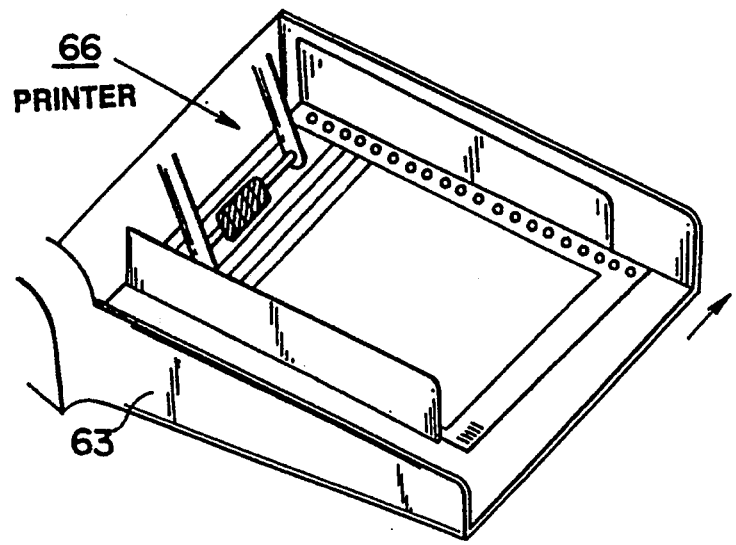

FIGS. 6A, 6B and 6C show the mechanism of the sheet receiving and issuing device 13, in which the FIG. 6A shows an example of the binder mounting and dismounting mechanism 60, which mounts and dismounts book sheets on and from the binder, FIG. 6B shows an example of the sheet inverting mechanism 65, which inverts a relevant book sheet in the front and rear side, and FIG. 6C shows an example of the sheet receiving and issuing mechanism 66, which receives and issues the relevant book sheet from and to the predetermined position.

The sheet receiving and issuing device 13 opens the book by means of the binder mounting and dismounting mechanism so that filing fixtures 62 of the binder 61 are directed right above and detaches the target book sheet from the filing fixtures of the binder. Then the book sheet is lifted so as to be vertical by means of the sheet sucking disk 53 and an external sheet feeding dish 63 is laid down by the sheet receiving and issuing mechanism 66.

In the case where the side to be printed at this time is the front side, the sheet sucking disk 53 is laid down so that the sheet is put on the external sheet feeding dish 63. On the contrary, in the case where the side to be printed is the rear side, the book sheet is inverted by releasing the sheet towards the printer after having brought it obliquely into contact with the right corner as indicated in FIG. 6C, while rotating the sheet sucking disk 53. The identifier printed on the relevant book sheet is read out by the identifier reading device 11 and the book sheet is sent to the printer by the sheet receiving and issuing mechanism 66 after having confirmed the target book sheet and the target page. Further, in the case where the position to be printed is on a not yet entered book sheet, a not yet entered book sheet is sent from a paper cassette to the printer by utilizing a sheet forwarding device for the printer.

When the printer has completed the printing, the entered book sheet is sent in the reverse direction by an instruction from the CPU 2 by utilizing the sheet forwarding device for the printer to return the entered book sheet to the external sheet feeding dish 63 by means of the sheet receiving and issuing mechanism 66. The entered book sheet is sucked by the sheet sucking disk 53 and lifted so as to be vertical, and the external sheet feeding dish 63 is raised up. In the case where data are printed on the back page of the relevant entry book sheet of the book, the arm of the sheet sucking disk 53 is further rotated so that the filing fixtures of the binder, where book sheets are turned, are made pass therethrough. Then sucking is stopped and the sheet sucking disk 53 is rotated so that the entered book sheet is turned and accommodated at an inverted position.

As described above, book sheets are sucked and printed one after another and this process is repeated. If the number of book sheets to be turned is great, the binder is once closed, page turning in the explanation made, referring to FIG. 5, is effected.

When the printer has completed printing completely for the book 51, the book 51 is closed and accommodated in a predetermined shelf 41.

Figure 7A:
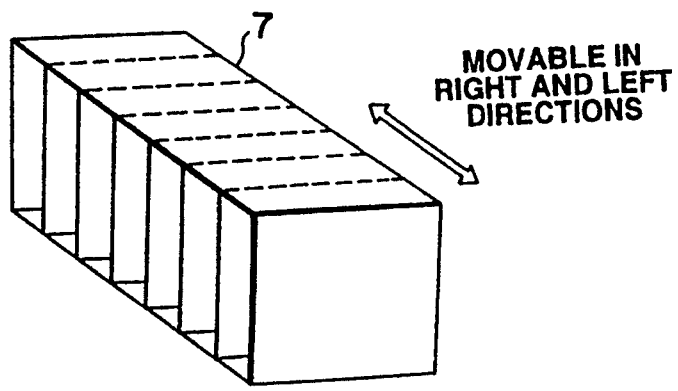
FIGS. 7A, 7B and 7C show other examples of the construction of the book holding shelf.
Figure 7B:
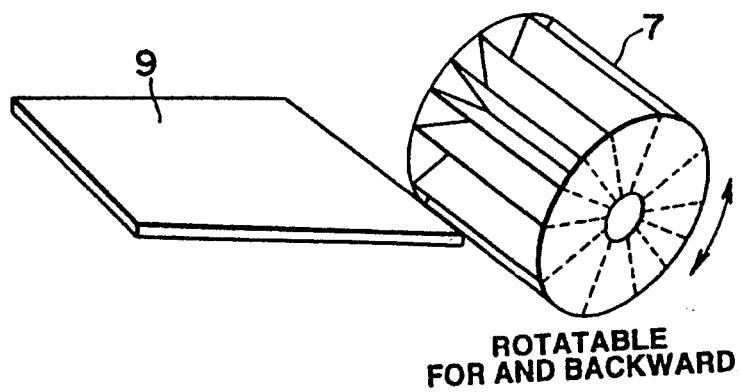
Figure 7C:
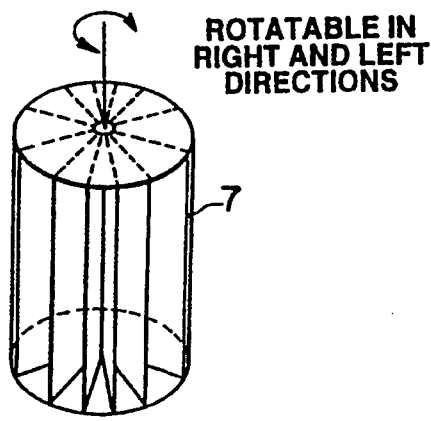

FIGS. 7A, 7B and 7C show other examples of the book holding shelf 7. Although, in the embodiment described above, the book holding shelf 7 is driven by the book holding driving device 6 so as to be moved up and downward, not restricted thereto, the book holding shelf 7 may be constructed e.g. as described below. That is, FIG. 7A is an example of the book holding shelf, which is driven in the right and left directions by the book holding shelf driving device 6, FIG. 7B is an example of the book holding shelf, which is driven so as to be rotated for and backward by the book hold shelf driving device 6, and FIG. 7C is an example of the book holding shelf, which is driven so as to be rotated in the right and left directions by the book holding shelf driving device 6.

Figure 8A:
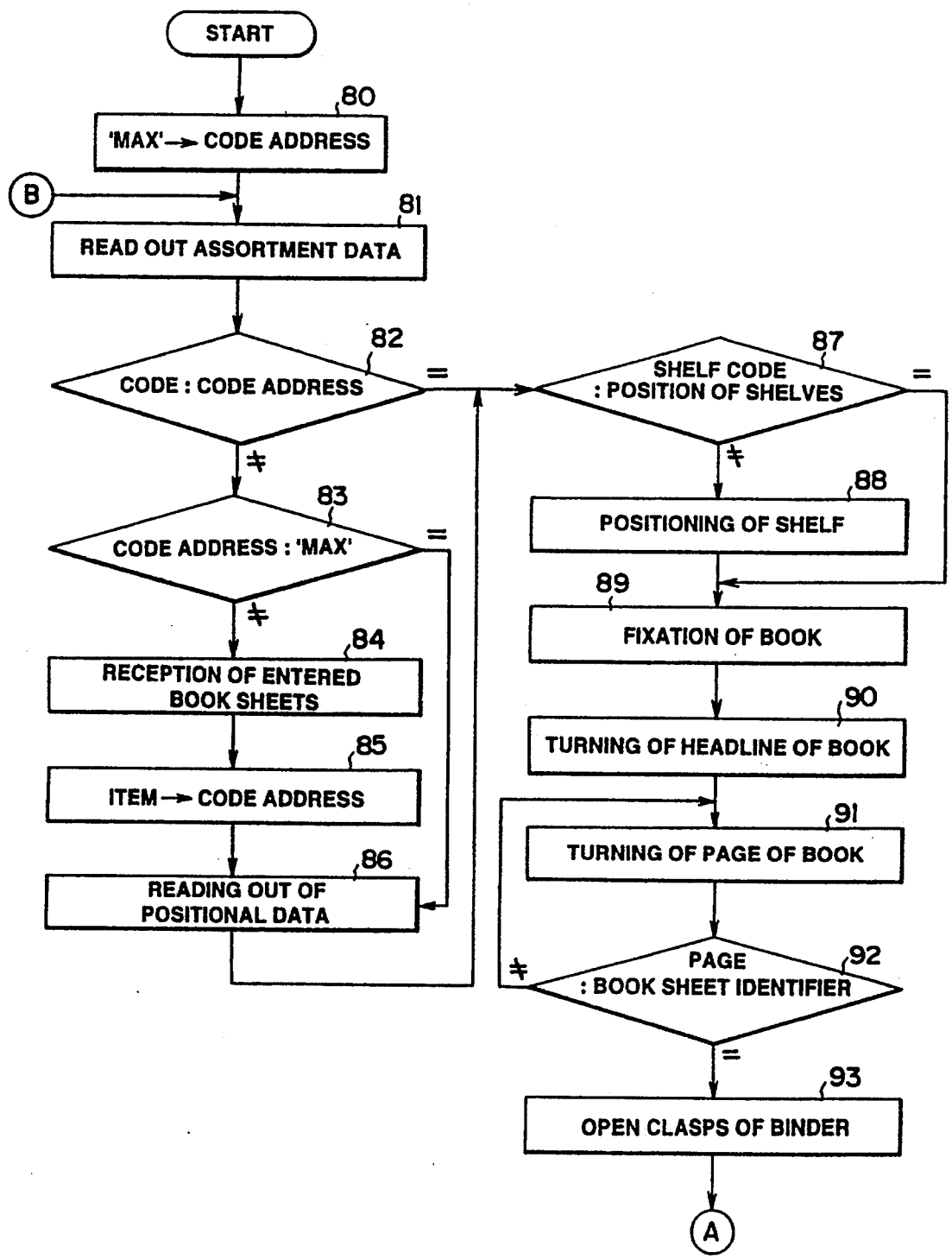
FIGS. 8A and 8B are flowcharts showing the operation of the accounting book automatic entering device indicated in FIG. 1.
Figure 8B:
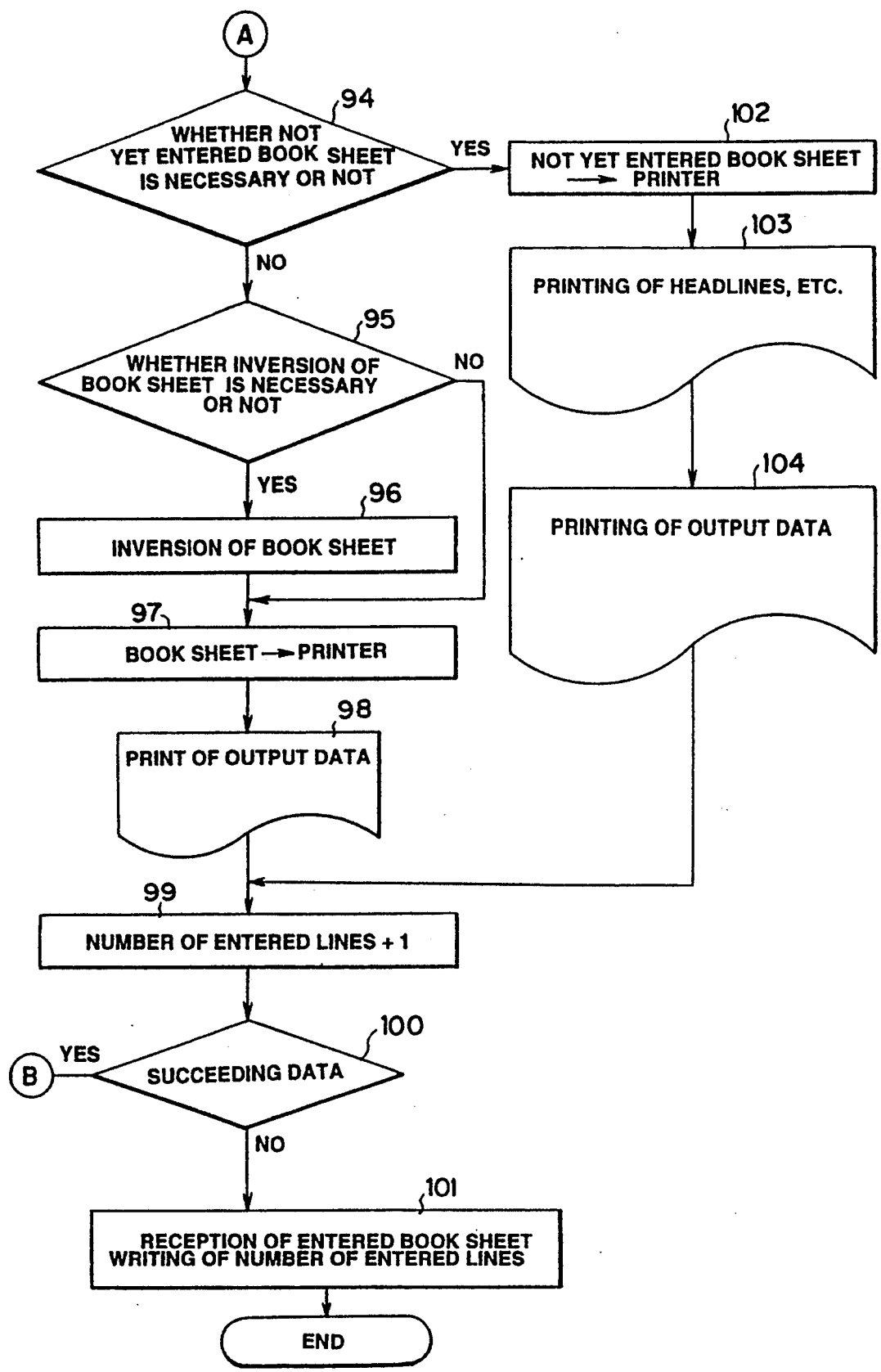

FIG. 8 is a flowchart indicating the operation of the accounting book automatic entering device indicated in FIG. 1. Hereinbelow entry operation for a journal, when the accounting book automatic entering device is applied to an accounting system, will be explained, referring to FIG. 8 and FIGS. 1 to 6A, 6B and 6C.

As explained in the paragraph for the prior art techniques, in an accounting system using a computer, trade data written on primary slips are inputted to be processed and stored in detailed assortment files. Since concrete operations such as input and processing of the trade data, verification of accordance thereof with different master files, storing of the trade data in detailed assortment files, collection and edition of the different master files and output of different book sheets are identical to those described in the paragraph on the prior art techniques, explanation thereof will be omitted in the present embodiment. In the following explanation it is supposed that the detailed assortment data are sorted in the order of the item code (identifier), the transaction data.

Step 80

Code MAX (e.g. "999", etc.) other than the item code is stored in a code address in the memory 2' as initial setting.

Steps 81 and 82

The assortment data are read out from the detailed assortment file 22 (Step 81) and the item code in the assortment data are compared with the content of the code address (Step 82). In the case where the item code in the assortment data is identical to the content of the code address, the procedure following Step 87 is executed. In the case where the item code in the assortment data is not identical to the content of the code address, Steps 83 to 86 are executed as overflow processing.

Steps 83 to 85

The shelf number address is compared with the content of the code address to know whether it is equal to MAX (Step 83). In the case where the shelf number address is equal to MAX, it is judged that the processing should be started and Step 86 is executed. In the case where the shelf number address is not equal to MAX, it is judged that overflow is produced. At this time the sheet receiving and issuing device is driven by the sheet receiving and issuing device driving section 12 and the entry page selecting device 9 is driven by the entry page selecting device driving section 8 to accommodate the entered book sheet in a shelf 41 corresponding to the shelf code 32 of the positional data 30 (Step 84) and to store the item code in the code address (Step 85).

Step 86

The positional data including an item code (identifier) 31, which is in accordance with the relevant item code, are read out from the positional information file 21 and Step 87 is executed.

Step 87

The shelf position identifier 42 is read out by the identifier reading device 11 and it is judged whether the shelf code and the shelf position identifier correspond to each other or not. When the shelf code 32 and the shelf position identifier 42 correspond to each other, Step 90 is executed.

In the case where the shelf code 32 and the shelf position identifier 42 do not correspond to each other, the book holding shelf 7 is moved, until the shelf position identifier 42 corresponds to the shelf code 32, by driving the book holding shelf 7 by means of the book holding shelf driving device 6 to position the shelf 41 at the predetermined position of the entry page selecting device 9.

Step 89

The binder of the book 51 is fixed and held by driving the book selecting mechanism 45 by means of the entry page selecting device 9.

Step 90

By driving the page turning mechanism 50 by means of the entry page selecting device 9 and by utilizing the headline 52 of a higher rank classification in the book 51, the book is opened at the first page of that classification (headline turning).

Step 91

Book sheets are turned by a necessary number of sheets by setting the page turning and sheet sucking disk 53 on the sheets (page turning).

Step 92

The identifier printed on the relevant book sheet is read out by the identifier reading device 11 and it is judged whether it corresponds to the content of the page section 33 or not. When it corresponds thereto, Step 93 is executed and when it does not correspond thereto, the procedure returns to Step 92 and book sheets are turned or they are turned inversely, until it corresponds thereto.

Subsequently, in the case where the book sheet is detached from the binder for printing, Step 93 is executed, while in the case where printing is effected on a book sheet bound in the binder, Step 98 is executed.

Step 93

The filing fixtures 62 of the binder 61 are released by driving the binder mounting and dismounting mechanism 60 by means of the sheet receiving and issuing device 13.

Step 94

It is judged whether the number in the page section 33 of the positional data 30 indicated in FIG. 3 is even (which means that the book sheet is on the rear side) and whether the content in the section 34 of the number of entered lines is equal to the maximum number of lines K for one page (51 lines in the present embodiment) or not. When it is equal thereto, Steps 102 to 104 are executed for taking out a not yet entered book sheet. On the contrary, when the number in the page section 33 is even and the content in the section of the number of entered lines is smaller than K or when the number in the page section 33 is odd which means that the book sheet is on the front side), Step 95 is executed.

Step 95

It is judged whether the number in the page section 33 is odd (which means that the book sheet is on the front side) and whether the content in the section 34 of the number of entered lines is equal to the maximum number of lines K for one page or not. When it is equal thereto, Step 96 is executed. On the contrary, when the number in the page section 33 is odd and the content in the section of the number of entered lines is smaller than K or when the number in the page section 33 is even, the procedure proceeds to Step 97.

Step 96

The book sheet, on which data should be entered, is inverted by driving the sheet inverting mechanism 65 so that the number of entered lines is zero.

Step 97

The book sheet, on which data should be entered, is supplied to the printer 4 by driving the sheet receiving and issuing mechanism 66 by means of the sheet receiving and issuing device 13.

Step 98

The printer 4 sets the printing head of the printer at the line, whose number is equal to number of entered lines $+1$ to print the content of the assortment data read out at Step 81.

Step 99

1 is added to the number of entered lines.

Step 100

It is judged whether a next assortment data exists or not and when it exists, the procedure returns to Step 81. On the other hand, when a next assortment data does not exist, Step 101 is executed as final procedure.

Step 101

The entered book sheet is accommodated in the shelf 41 corresponding to the shelf code 32 of the positional data 30 by driving the sheet receiving and issuing device 13 by means of the sheet receiving and issuing device driving section 12 and the entry page selecting device 9 by means of the entry page selecting device driving section 8 and at the same time the number of entered lines is stored in the section 34 of the number of entered lines of the positional data 30. In this way a series of operations is terminated.

Step 102

A not yet entered book sheet is supplied to the printer 4 by means of the sheet forwarding device for the printer.

Steps 103 and 104

Fixed items such as headlines, etc., the amount of money carried forward, etc. are printed on the not yet entered book sheet (in the case where an numerical item on the amount of money carried forward is printed or data are printed, leaving out space for one line, this line is counted as an entered line) (Step 103) and then the content of the assortment data is printed (Step 104). Further, in the case where a bar code is used as an identifier for the book sheet as described later, the bar code is printed on an upper or lower part of the book sheet is printed at this step. Then Step 99 is executed.

In FIGS. 4, 5A and 5B, the book or the book sheet is checked by using the identifier reading device 11 together with the entry page selecting device 9 or the sheet receiving and issuing device 13. The identifier reading device 11 in this case may read the item code, etc. by means of an optical letter reading device or it may be a bar code reader.

FIGS. 9A to 9C show an example (current account) of the output book sheet outputted on the basis of the operations described above, in a lower part of which a bar code is printed as an identifier for the book sheet.

Although printing of a journal is taken as an example in the embodiment, data can be entered everyday in necessary book sheets such as a general accounting ledger, a stored goods ledger, a bill book, etc. Not yet entered book sheets may be bound in a book or they may be accommodated in a paper cassette for the printer and taken out from the cassette by means of the sheet forwarding device. Further the whole device is so constructed that there may be disposed a shelf exclusively used for accommodating not yet entered book sheets in the book holding shelf, from which sheets are taken out.

The accounting book automatic entering device according to the present invention can be applied to a business calculating system such as a sales management system, a purchase management system, a stock management system, a bill management system, etc., not restricted to the accounting system.

As explained above, by using the accounting book automatic entering device according to the present invention, since trade data can be recorded in the lines directly succeeding the last line of the preceding recording in all the relating books in an accounting system only by inputting one assortment through a keyboard for a certain trade, e.g. when a certain article is sold on credit, the relevant trade is recorded in a journal and transcribed into a general accounting ledger only by inputting assortment of credit; decrease in the relevant article is recorded in a stored goods ledger; and credit of the relevant customer is increased in a customer ledger. Further an invoice, a statement of delivery and a bill are also issued on real time.

Furthermore, since record can be continuously printed without interruption and rear sides of book sheets can be used as succeeding pages, not only utilization efficiency of paper is increased significantly but also uselessness that data are printed every time when it is necessary can be removed. Therefore the amount of used paper is smaller than 1/10 with respect to that required for a prior art accounting system using a computer. Further, since trade data are conserved, always put in order, just as with bound books, they can be taken out any time, when required, to be accessed without any special device nor time nor man power for newly filing book sheets.

Furthermore, in the case where amount of data is not so great that they can be printed everyday on book sheets by using the accounting book automatic entering device according to the present invention, since small detailed assortment files are sufficient, the present invention can be easily applied to an accounting system using a personal computer, etc.

What is claimed is:

1. An accounting book automatic entering device comprising:
    a computer device;
    a memory device containing a plurality of output data sets, to which a branch code, a division code, or a business connection code can be added arbitrarily, and which have identifiers making it possible to identify a page and a line, in which the data sets are to be printed;
    a printer;
    a book holding shelf provided with a plurality of shelves holding books;
    a book holding shelf driving device; and
    an entry page selecting device provided with a book selecting mechanism for taking out by selecting a specified book from said book holding shelf to fix the position of the book and a page turning mechanism for selecting a specified page in said book;
    wherein said computer device controls the whole device so that a shelf in said book holding shelf corresponding to output data is located at a predetermined position of said entry page selecting device by said book holding shelf driving device; said specified book is taken out by selecting it by means of said book selecting mechanism; said book is opened at a target page by said page turning mechanism; and said book is closed and returned to an original position thereof in said book holding shelf after said output data have been printed at the position, in which they should be printed, on the relevant page by said printer.

2. An accounting book automatic entering device according to claim 1, further comprising:
    a sheet receiving and issuing device provided with a binder mounting and dismounting mechanism for mounting and dismounting a book sheet on and from a binder;
    a sheet inverting mechanism for inverting said book sheet from a front to a rear side;
    a sheet receiving and issuing mechanism for receiving and issuing said book sheet from a predetermined position;
    wherein said book sheet is detached from said binder by said binder mounting and dismounting mechanism, said book sheet is inverted from a front to a rear side, if it is necessary to print trade data on the rear side; said book sheet is supplied to said printer by said sheet receiving and issuing mechanism; line forwarding means of said printer forwards said book sheet line by line till an entry position; after said output data have been recorded, said book sheet is bound at said original position thereof in said book; said book is closed and returned to said original position thereof in said book holding shelf.

3. An accounting book automatic entering device according to claim 1, further comprising preferably
    an identifier reading device for reading an identifier, an entry book sheet having an identifier; and
    book sheet judging means for judging whether said book sheet selected by said entry page selecting device is correct or not by comparing said identifier on said book sheet with said identifier in the output data.

4. An accounting book automatic entering device according to claim 1, wherein when a not yet entered book sheet is supplied to said printer, it prints an identifier on said not yet entered book sheet together with other marks.

5. An accounting book automatic entering device according to claim 3, wherein said identifier is a bar code and said identifier reading device is a bar code reader.

* * * * *